(12) United States Patent
Meyer et al.

(10) Patent No.: US 12,169,492 B1
(45) Date of Patent: Dec. 17, 2024

(54) SYSTEMS AND PROCESSES FOR ADAPTIVE QUERY EXECUTION OPTIMIZATION

(71) Applicant: United Services Automobile Association (USAA), San Antonio, TX (US)

(72) Inventors: Gregory Brian Meyer, San Antonio, TX (US); Steven Moffa, San Antonio, TX (US)

(73) Assignee: United Services Automobile Association (USAA), San Antonio, TX (US)

( * ) Notice: Subject to any disclaimer, the term of this patent is extended or adjusted under 35 U.S.C. 154(b) by 0 days.

(21) Appl. No.: 18/070,123

(22) Filed: Nov. 28, 2022

Related U.S. Application Data (60) Provisional application No. 63/284,471, filed on Nov. 30, 2021.

(51) Int. Cl.
*G06F 16/2453* (2019.01)
*G06F 16/2455* (2019.01)
*G06F 16/28* (2019.01)

(52) U.S. Cl.
CPC .... *G06F 16/24542* (2019.01); *G06F 16/2455* (2019.01); *G06F 16/287* (2019.01)

(58) Field of Classification Search
None
See application file for complete search history.

(56) References Cited

U.S. PATENT DOCUMENTS

| | | | |
|---|---|---|---|
| 2019/0258631 A1* | 8/2019 | Pal | G06F 16/22 |
| 2020/0201867 A1* | 6/2020 | Lappas | G06F 16/248 |
| 2021/0019321 A1* | 1/2021 | Ehrlich | G06N 20/00 |

* cited by examiner

*Primary Examiner* — Kannan Shanmugasundaram
(74) *Attorney, Agent, or Firm* — Fletcher Yoder, P.C.

(57) ABSTRACT

The present disclosure is directed to systems and processes for adaptively optimizing query execution. To improve efficiency and reduce costs of executing queries, machine learning may be utilized to automatically choose or adjust the processing blocks used to execute or process queries based on the nature of the cloud processing outputs and client preferences, among other considerations. A machine learning engine may group queries together into topics based on characteristics of the queries. The machine learning engine may receive execution statistics for the topics and, using the execution statistics, identify which topics enhance or optimize query execution. The machine learning engine may determine which topics may be executed by which processing blocks, at which times of day, and on which platforms, among other considerations in order to enhance or optimize cost or processing efficiency according to client-specified parameters.

20 Claims, 7 Drawing Sheets

| QUERY 1 | | | |
|---|---|---|---|
| | EXECUTION LENGTH | EXECUTION TIME | MEMORY USED |
| EXECUTION 1 | 0.2 SECONDS | 1:00 P.M. | 10 MB |
| EXECUTION 2 | 0.09 SECONDS | 1:30 P.M. | 10 MB |
| EXECUTION 3 | 0.1 SECONDS | 2:00 P.M. | 10 MB |

| QUERY 2 | | | |
|---|---|---|---|
| | EXECUTION LENGTH | EXECUTION TIME | MEMORY USED |
| EXECUTION 1 | 0.2 SECONDS | 1:00 P.M. | 5 MB |
| EXECUTION 2 | 0.09 SECONDS | 1:30 P.M. | 5 MB |
| EXECUTION 3 | 0.3 SECONDS | 2:00 P.M. | 5 MB |

| TOPIC MODELING RESULT | | | |
|---|---|---|---|
| TOPIC | AVERAGE EXECUTION LENGTH | EXECUTION TIME | AVERAGE MEMORY USED |
| 502 — TABLE X (x.name) | 0.2 SECONDS<br>0.09 SECONDS<br>0.2 SECONDS | 1:00 P.M.<br>1:30 P.M.<br>2:00 P.M. | 7.5 MB<br>7.5 MB<br>7.5 MB |
| 504 — TABLE X / TABLE Y (x.name) | 1.20 SECONDS | 1:30 P.M. | 100 MB |

SYSTEMS AND PROCESSES FOR ADAPTIVE QUERY EXECUTION OPTIMIZATION

CROSS-REFERENCE TO RELATED APPLICATIONS

This application claims priority to and the benefit of U.S. Provisional Application No. 63/284,471, entitled "Systems and Processes for Adaptive Query Execution Optimization," filed Nov. 30, 2021, which is hereby incorporated by reference in its entirety for all purposes.

BACKGROUND

The present disclosure relates generally to system and processes for adaptive optimization of query execution.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g., productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing-based services. By doing so, users are able to access computing resources on demand that are located at remote locations. These resources may be used to perform a variety of computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able to redirect their resources to focus on their enterprise's core functions.

In modern communication networks, examples of cloud computing services may include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts as an extension of SaaS that goes beyond providing software services by offering customizability and expandability features to meet a user's needs. For example, PaaS can provide a cloud-based developmental platform for users to develop, modify, and/or customize applications and/or automate enterprise operations without maintaining network infrastructure and/or allocating computing resources normally associated with these functions.

A cloud services provider may provide a variety of processing blocks that enable processing (e.g., execution) of a client's queries. The processing blocks execute the queries by utilizing various processors of differing size and/or processing power, types of memory, amounts of memory, and so on. Unfortunately, the cost of these blocks is oftentimes large and the distributed and universal nature of these blocks create inefficiencies, as offered blocks are not custom tailored to a client's processing requirements.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

It is now recognized that query execution via distributed processing blocks may be optimized for a client's desired parameters by implementing dynamic adjustments to the number and type of processing blocks used to execute the queries, based upon factors of client's particular processes. For example, a client may desire to minimize cost of executing queries, and as such may choose a less costly processing block that utilizes fewer processors, less powerful processors, less memory, or any combination thereof (e.g., a processing block may utilize 100 megabytes (MB) of memory and have an execution length of 1 second). However, if the client desires to increase or maximize efficiency of query processing, the client may choose a more costly processing block that utilizes a greater number of processors, more powerful processors, a greater amount of memory, or any combination thereof (e.g., a processing block may utilize 200 MB of memory and have an execution length of 0.5 seconds). Additionally, the cost efficiency or processing efficiency may be optimized based on the time of day the query execution occurs (e.g., in the morning, in the evening, at night) or on the platform used to execute the queries (e.g., using one cloud service provider's platform for one group of queries and another cloud service provider's platform for another group of queries).

In some instances, the client may desire to have certain queries or groups of queries execute via one processing block and have other queries or groups of queries execute via a different processing block. To determine which processing blocks will execute which queries, the client of the cloud services provider may be required to manually observe the client's own queries and manually change parameters of the cloud computing resources in order to tailor the cloud computing resources to the client's needs and/or to enhance performance of the cloud computing resources. This may result in greater overhead costs for the client (e.g., in man-hours) and greater fees related to cloud computing services (e.g., as a more costly processing block may be used to execute queries that could be efficiently executed in a less costly processing block). In order to improve efficiency and reduce costs of executing or processing queries, machine learning (ML) may be utilized to automatically choose or adjust the processing blocks used to execute or process particular queries based on the nature of the cloud processing, such as logs or application processing interface (API) returns, and client preferences, among other considerations.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which.

DETAILED DESCRIPTION

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

As previously discussed, in order to improve efficiency and reduce costs of executing or processing queries, machine learning (ML) may be utilized to automatically choose or adjust the processing blocks used to execute or process queries based on the nature of the cloud processing outputs (e.g., logs or API returns) and client preferences, among other considerations. An ML engine may group queries together based on characteristics of the queries (e.g., objects and/or constraints of the queries). Objects of the queries may include tables, indices, catalogs, schemas, journals, or any combination thereof. The ML engine may receive execution statistics for the groups of queries and, using the execution statistics, identify which groups of queries may be executed together to enhance or optimize execution efficiency. The ML engine may then determine which groups of queries may be executed by which processing blocks, at which times of day, and on which platforms, among other variables in order to enhance or optimize cost or processing efficiency according to client-specified parameters.

Figure 1:
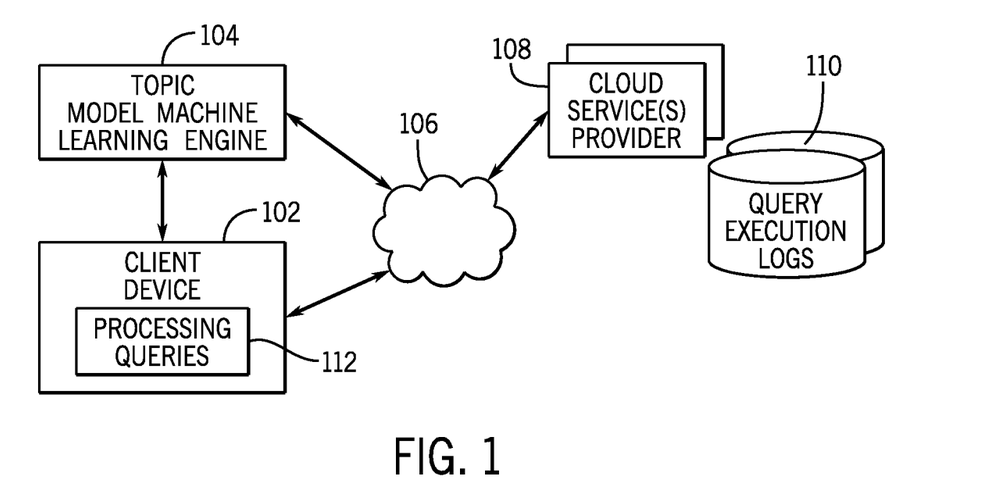
FIG. 1 is a block diagram of an embodiment of a system for submitting, processing, and optimizing queries, in accordance with aspects of the present disclosure.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, FIG. 1 is a diagram of a system 100 for submitting, processing, and optimizing the execution of queries, according to an embodiment of the present disclosure. A client device 102 may submit a query or queries (e.g., one or more processing queries 112) to a cloud services provider 108 via a network 106. As previously discussed, the cloud services provider 108 may execute the queries using various types and amounts of processing blocks (e.g., as specified/requested by the client/client device 102). To optimize the execution of the queries (e.g., decrease cost of execution and/or decrease query execution time according to specifications of a client or client organization of the cloud services provider 108) a topic model machine learning (ML) engine 104 may be utilized. The topic model ML engine 104 may be an ML service that collects query execution data and utilizes the query execution data to perform ML-based topic modeling.

The topic model ML engine 104, the client device 102, or both may submit the queries to the cloud services provider 108 via the network 106. The cloud service provider 108 may execute the queries received from the topic model ML engine 104 and/or the client device 102. Upon execution by the cloud services provider 108, the query execution data (e.g., query execution statistics) related to one or more executions of the queries may be stored in the query execution logs 110. The query execution statistics stored in the query execution logs 110 may be utilized by the cloud services provider 1008, the client device 102, the topic model ML engine 104, or any combination thereof, to optimize execution of the queries.

Figure 2:
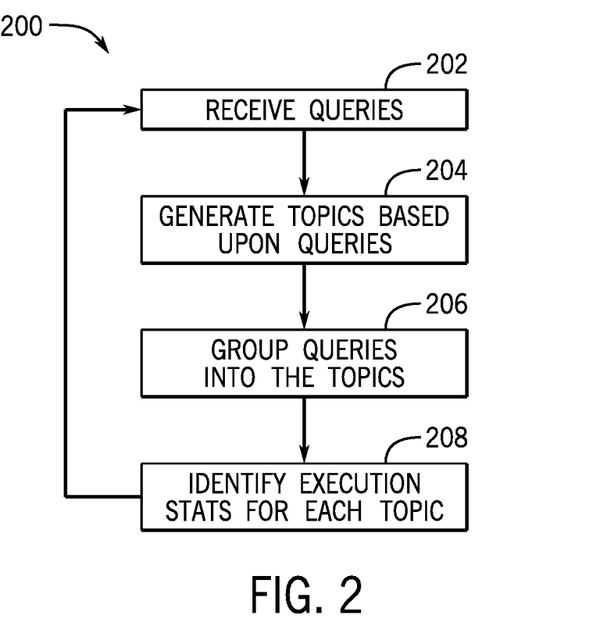
FIG. 2 is a flowchart of a process by which a topic model ML engine may group the queries into topics and identify execution statistics for each topic, in accordance with aspects of the present disclosure.

FIG. 2 is a flowchart of a process 200 by which the topic model ML engine 104 may group the queries into topics and identify execution statistics for each topic, according to an embodiment of the present disclosure. In process block 202 the topic model ML engine 104 receives one or more queries from the client device 102. In process block 204 the topic model ML engine 104 generates topics based upon the queries received in the process block 202. A topic may be defined by one or more characteristics of the queries. The characteristics may include varying levels of granularity. For example, a topic may be defined by an object of the query (e.g., a table), or a constraint, such as a column (e.g., names listed in a table), a specific value within the column (e.g., name=John), a specific value with a specific modifier (e.g., name=John*), or a combination of all of the above and any other relevant characteristics of the query. In process block 206 the topic model ML engine 104 may group the queries into the topics.

The queries may be grouped by object (e.g., group all queries directed to a Table X and all queries directed to a Table Y), and/or by a constraint (e.g., specific value within a column of the table). For example, a first query (e.g., a Structure Query Language (SQL) query) may include Select *from TblX where x.name="john*". In the first query, TblX is the object, x.name is the constraint, x.name="john" is a specific value of the constraint, and the wildcard (i.e., the asterisk) is a modifier to the specific value of the constraint. The response to the first query will include the character or strings of characters following the name John found in entries of TblX. A second query Select name, address from TblX where x.name "mark*" will return the name and address within TblX entries containing the name Mark followed by a character or string. As mentioned, these queries may be grouped by object (TblX), by constraint (x.name) or any other appropriate delineation (e.g., x.name="mark" or x.name="mark*")

In some embodiments, machine learning can be used to identify potentially relevant characteristics that, when present, may affect the execution statistics of a query and, thus, a topic. For example, as will be discussed in more detail below with regard to FIG. 5, machine learning models may use query statistics to identify characteristics (e.g., use of wildcards, use of internal optimizations, etc.) that may have a positive or negative impact on query execution statistics. In such a scenario, the topics may be defined based upon the presence or absence of these potentially relevant characteristics, which may aid in better analysis of potential execution statistics for a given group of queries bundled into a topic.

In process block 208, the topic model ML engine 104 may identify execution statistics for each topic. The execution statistics may include data regarding query execution length, time of query execution, memory used during query execution, and so on for a bundle of queries of a particular topic. To do this, execution statistics of particular queries may be identified. Based upon these executions statistics for each particular query, topic statistics may be derived, by aggregating (e.g., via averaging adding, etc.) statistics of each query in a given topic. This will be illustrated in more detail with regard to FIG. 6.

Figure 3:
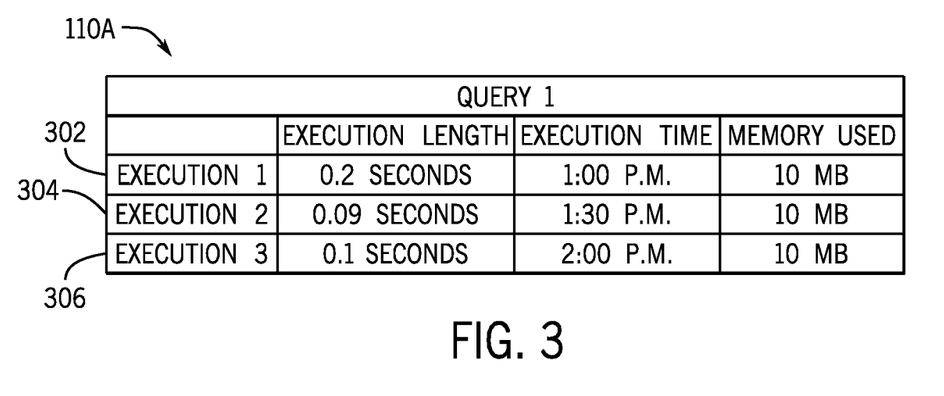
FIG. 3 is a table representing an execution log for a first query, in accordance with aspects of the present disclosure.

Starting first with FIG. 3, FIG. 3 is a table representing an execution log 110A for a first query (Query 1), according to an embodiment of the present disclosure. The execution log 110A may record the execution length of, execution time of, and memory used by a first execution (Execution 1) 302 of Query 1, a second execution (Execution 2) 304 of Query 1, and a third execution (Execution 3) 306 of Query 1 (e.g., executions of Query 1 performed at different times).

Figure 4:
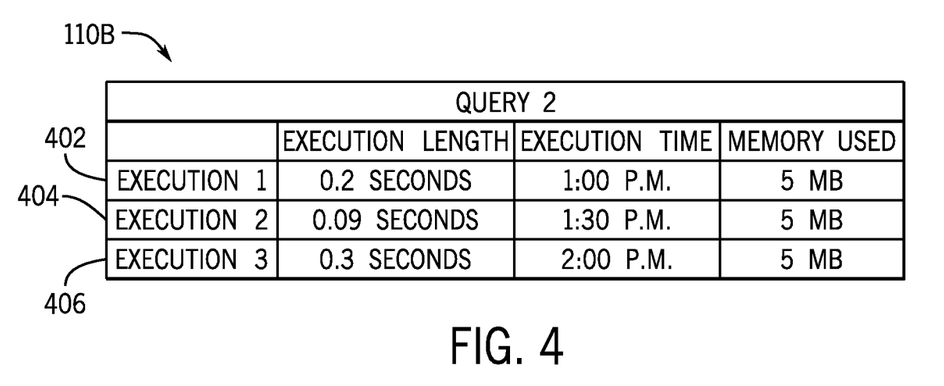
FIG. 4 is a table representing an execution log for a second query, in accordance with aspects of the present disclosure.

FIG. 4 is a table representing an execution log 110B for a second query (Query 2), according to an embodiment of the present disclosure. Similarly to the execution log 110A of FIG. 3, the execution log 110B may record the execution length of, execution time of, and memory used by a first execution (Execution 1) 402 of Query 2, a second execution (Execution 2) 404 of Query 2, and a third execution (Execution 3) 406 of Query 2. As used herein, the execution log 110A and the execution log 110B may collectively be referred to as the execution logs 110.

Figure 5:
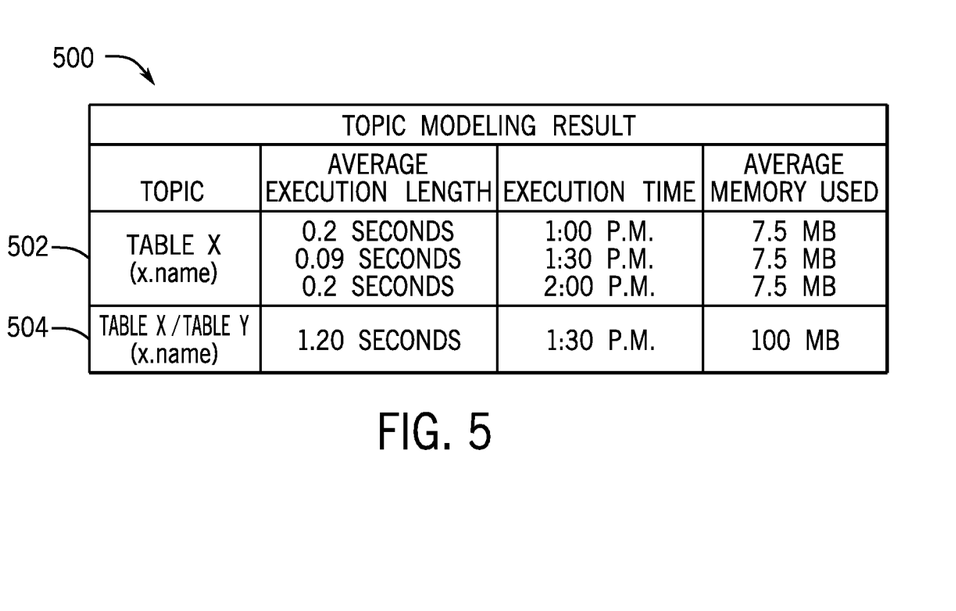
FIG. 5 is a table illustrating topic modeling results, in accordance with aspects of the present disclosure.

FIG. 5 is a table illustrating topic modeling results 500, according to an embodiment of the present disclosure. The topic modeling results 500 may average (or otherwise aggregate) the results taken from the execution logs 110 to identify divergent execution between various topics. Topic 502 is an average of the execution statistics regarding the Query 1 and the Query 2 in the execution log 110A and the execution log 110B, respectively over time. As may be observed, the topic 502 averages the executions of the Query 1 and the Query 2 by time of execution. For example, Execution 3 306 of Query 1 is averaged with Execution 3 406 of Query 2, resulting in the query executions at 2:00 P.M. having an average execution length of 0.2 seconds and using an average of 7.5 MB of memory.

Topic 504 is an average of a topic including another grouping of queries directed to Table X as well as another table (Table Y). The topic 504 may include a query or group of queries that join TblX and TblY using x.name. As may be observed, the average execution length and the average memory used of the topic 504 is greater than that of the topic 502 (e.g., due to involving two objects).

In certain embodiments, the execution statistics of the topic may be improved by using certain features in the query. With the use of different processing platforms, different query characteristics may have different impacts on process execution. Because many implementation details of the processing platform many not be known, it may be difficult to anticipate how certain characteristics of a query will impact execution. For example, internal optimization, as previously discussed, may positively impact query execution in some platforms but may not in others (e.g., based upon implementation details of the processing platform). As will be discussed in greater detail below, grouping the queries into the topics 502 and 504 may enable the topic model ML engine 104 to choose processing blocks for the topics so as to optimize scheduling of the queries by using the most appropriate processing blocks for each topic, according to parameters specified by the client.

Figure 6:
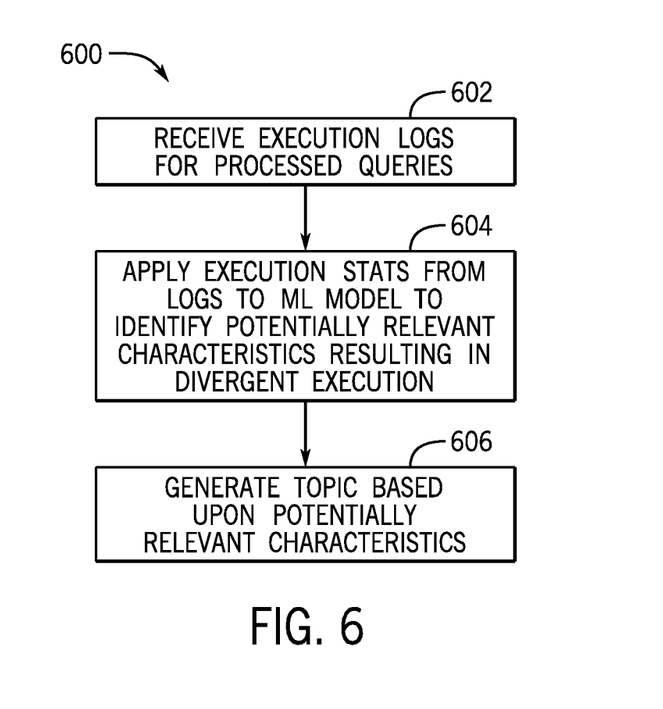
FIG. 6 is a flowchart of a process for generating topics based upon potentially relevant characteristics of queries for internal optimization, in accordance with aspects of the present disclosure.

To identify particular potentially relevant characteristics that may impact execution of queries for a particular processing platform, machine learning models may be trained using the execution statistics for queries on the particular platform. As mentioned above, the topics, in some scenarios may be based upon potentially relevant characteristics. The example provided in FIG. 6 is a flowchart of a process 600 for identifying potentially relevant characteristics and generating topics based upon these potentially relevant characteristics of queries, according to an embodiment of the present disclosure. In process block 602 the topic model ML engine 104 receives execution logs (e.g., the execution logs 110) for processed queries. In process block 604, the topic model ML engine 104 applies the execution statistics from the execution logs 110 to an ML model to identify potentially relevant characteristics resulting in divergent execution.

In the process block 604, the topic model ML engine 104 may, for example, identify that the divergence in the average execution length and average memory used between the topic 502 and the topic 504 is due to the fact that the Table Y has significantly more rows and columns of data than the Table X. The divergence may also be based on factors such as utilization of common table expressions (CTEs). For example, the topic 502 may decrease average execution length and average memory used through utilization of CTEs.

In process block 606, the topic model ML engine 104 may generate topics based upon the potentially relevant characteristics of the query (e.g., indices usage metadata, use of the CTEs). That is, as a result of applying the execution statistics from the execution logs 110, the topic model ML engine 104 may group queries into topics so as to facilitate internal optimization by grouping together queries in such a way that enhance or optimizes execution of the queries.

Figure 7:
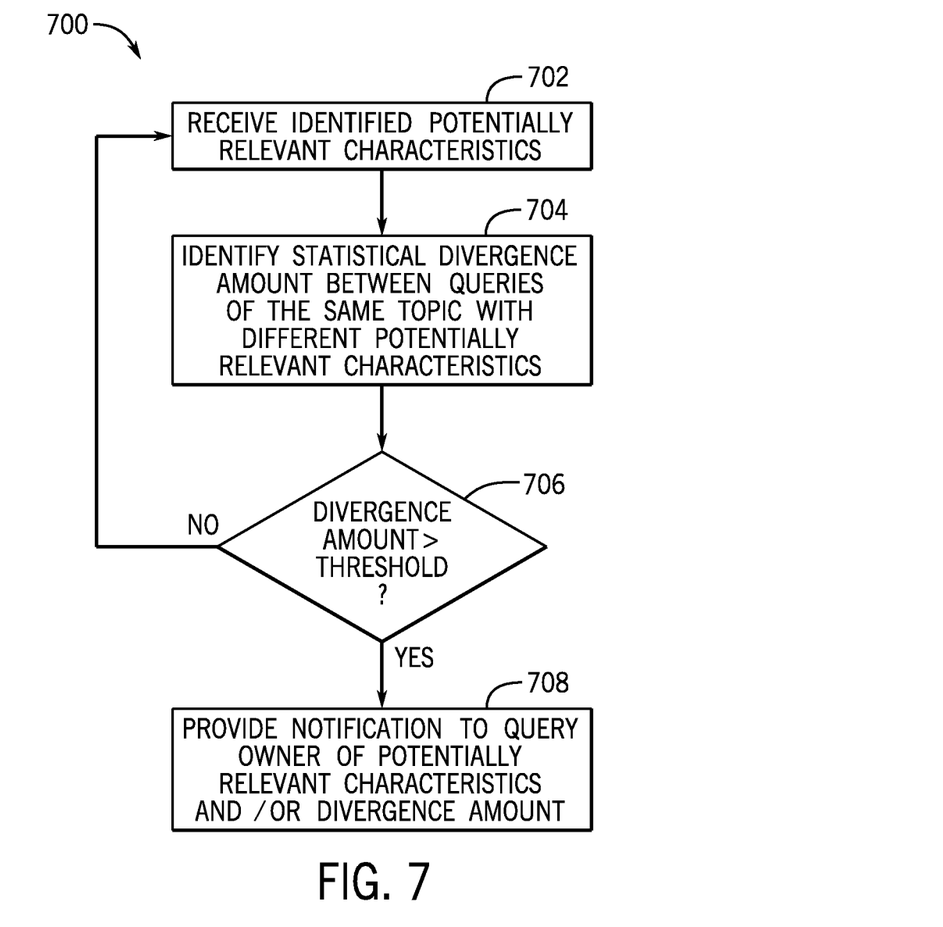
FIG. 7 is a flowchart of a process for determining whether to notify the client and notifying the client of divergent execution between two or more query executions, in accordance with aspects of the present disclosure.

FIG. 7 is a flowchart of a method 700 for determining whether to notify the client and notifying the client of divergent execution between two or more query executions, according to an embodiment of the present disclosure. In process block 702, the topic model ML engine 104 may receive identified potentially relevant characteristics (e.g., based upon the process in FIG. 6). In process block 704, the topic model ML engine 104 may identify a statistical divergence between queries of the same topic with different potentially relevant characteristics. For example, if one query in a topic uses 100 MB of memory and another query in the same topic uses 1 MB of memory, this statistical divergence may indicate that a more granular query definition may be desirable (e.g., grouping queries based on a modifier such as a leading or trailing wildcard (*) rather than based only on object and constraint).

In query block 706 the topic model ML engine 104 may determine whether the amount of divergence between the queries of the same topic with different potentially relevant characteristics is greater than a divergence threshold. The divergence threshold may be predefined or may be dynamically determine by the topic model ML engine 104. If the topic model ML engine 104 determines that the divergence amount is less than the divergence threshold, the topic model ML engine 104 may return to the process block 702 and continue to receive identified potentially relevant characteristics for the queries or for incoming queries.

However, if, in the query block 706 the topic model ML engine 104 determines that the divergence amount is greater than the divergence threshold, in process block 708 the topic model ML engine 104 may provide a notification to the client of the potentially relevant characteristics and/or the divergence amount. In this manner, insight regarding effective query drafting may be provided. For example, FIG. 8 illustrates such an insight provided via a graphical user interface.

Figure 8:
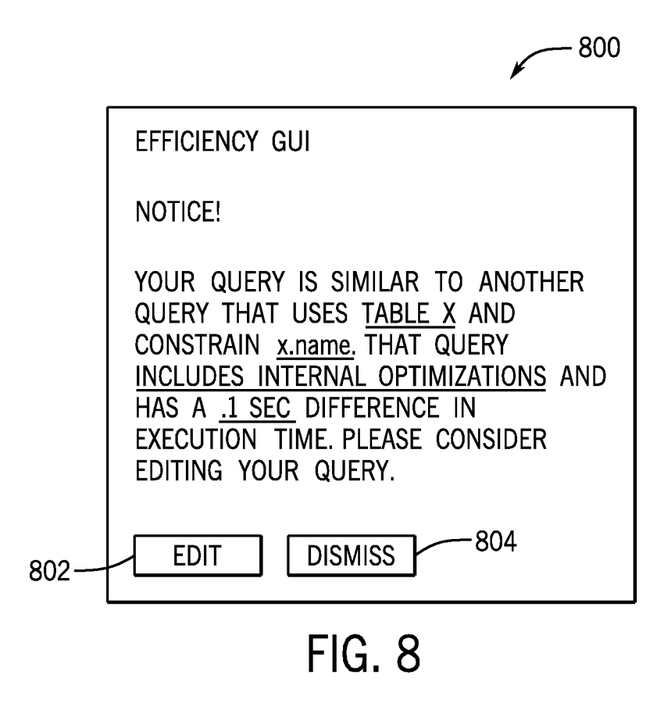
FIG. 8 is an efficiency graphical user interface (GUI) provided by the topic model ML engine to notify the client of the query execution divergence, in accordance with aspects of the present disclosure.

FIG. 8 is an efficiency graphical user interface (GUI) 800 provided by the topic model ML engine 104 to notify the client of the query execution divergence, according to an embodiment of the present disclosure. The efficiency GUI 800 may notify the client that one query is performing less efficiently than another similar query (e.g., a query using the same object and constraint but executing with greater efficiency). For example, the efficiency GUI 800 may notify the client of the statistical divergence over the threshold. For example, the efficiency GUI 800 may notify the client that one query is executing slower than another similar query, or that one query is consuming greater memory than another similar query.

The efficiency GUI 800 may inform the client of the potentially relevant characteristics that may be responsible for the divergence (e.g., that the more efficient query includes internal optimizations, such as utilizing common table expressions (CTEs)) and provide recommendations to the client based on the identified potentially relevant characteristics. The efficiency GUI 800 may provide an edit affordance 802 to enable the client to edit the query; such as by editing the less efficient query to include a recommended internal optimization. The efficiency GUI 800 may provide a dismiss affordance 804 that the client may select if the client does not desire to resolve the divergent execution.

Figure 9:
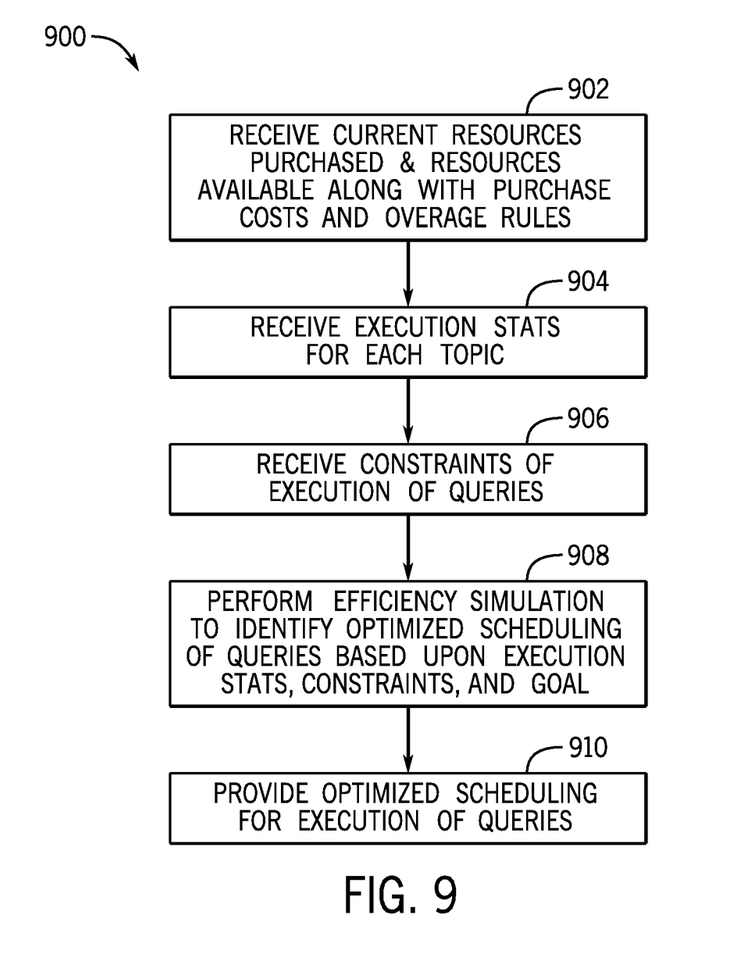
FIG. 9 is a flowchart of a process for providing optimized scheduling for the execution of queries, in accordance with aspects of the present disclosure.

FIG. 9 is a flowchart of a process 900 for providing optimized scheduling for the execution of queries, according to an embodiment of the present disclosure. In process block 902 the topic model ML engine 104 may receive current resources purchased (e.g., processing blocks currently purchased by the client organization) and resources available along with purchase costs and overage rules. Overage rules are rules implemented by the cloud services provider 108 that define protocols that may take place if a processing block purchased by the client organization to execute a topic or query exceeds the processing block's capacity when executing the topic or query. For example, if a client organization purchases a block with 100 MB of memory but executing the query or topic uses 200 MB of memory, the cloud services provider 108 may require that the client organization pay for additional blocks to account for the overage.

In process block 904, the topic model ML engine 104 may receive execution statistics for each topic (e.g., as previously discussed and shown in the topic modeling results 500). For example, the execution statistics for a given topic may include an average execution time, average memory utilization, etc. of queries in the topic at a particular execution time.

In process block 906, the topic model ML engine 104 may receive constraints (e.g., business constraints) of the execution of the queries. The constraints may include cost constraints (e.g., the client organization may specify a desired cost per day, cost per month, cost per query, and so on) or time constraints (e.g., the client organization may specify that queries be executed in less than 1 second, less than 0.5 seconds, and so on).

In process block 908, the topic model ML engine 104 may perform an efficiency simulation to identify optimized scheduling of queries based upon the execution statistics received in the process block 904, based on the constraints received in the process block 906, and a specified goal (e.g., minimize cost of query processing, maximize efficiency of query processing, and so on) of the client organization. For example, a Monte Carlo simulation may be performed using the constraints and goals, to discern a probability that an indicated goal will be reached for particular schedules of execution of the topics (e.g., their underlying queries). Monte Carlo simulation is a model used to predict the probability of different outcomes, given random variables that may be present. In the current embodiments, one example of such a variable may be performance constraints that may delay execution of the queries.

In process block 910, the topic model ML engine 104 may provide an optimized scheduling for the execution of the queries, based upon the results of the simulation. For example, the Monte Carlo simulation may result in a list of schedules of execution of queries/bundles of queries of a topic that is ranked based upon their probability of fulfilling an indicated goal. The optimized scheduling may include which queries are to be executed together (e.g., which queries are to be grouped together as topics), the time of day at which queries and/or topics are to be executed, which processing blocks on which the queries and/or topics are to be executed, and so on. The recommended optimized scheduling may be outputted to an electronic device (e.g., an electronic block order and schedule indication to the cloud service provider 108 for automatic block ordering and scheduling and/or an electronic command to the client device 102 to render a scheduling GUI for approval and subsequent submission of a block request and scheduling of blocks).

Figure 10:
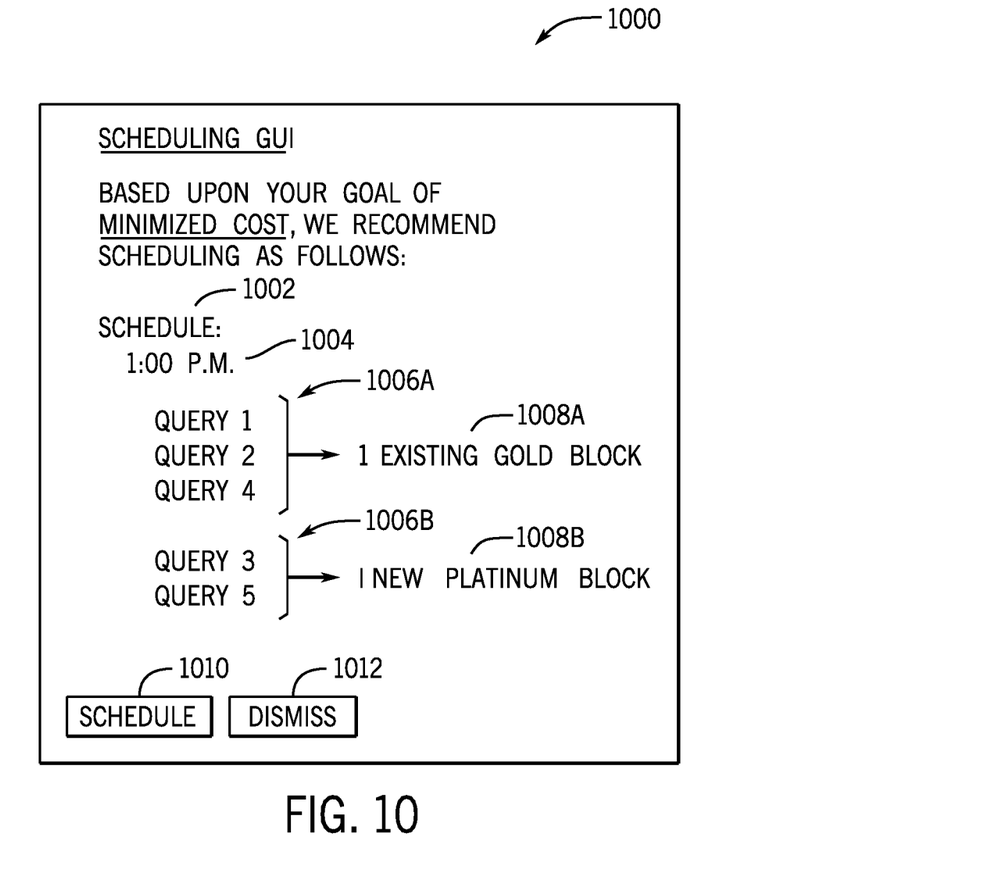
FIG. 10 is a scheduling GUI that enables the client to view one or more recommended execution schedules determined by the topic model ML engine 104, in accordance with aspects of the present disclosure.

FIG. 10 illustrates is a scheduling GUI 1000, according to an embodiment of the present disclosure. The scheduling GUI 1000 may enable the client organization to view one or more recommended execution schedules (e.g., 1002) determined by the topic model ML engine 104. The recommended execution schedule 1002 may include a recommended execution time 1004, one or more recommended topics 1006A and 1006B, and a number of and type of processing blocks 1008A and 1008B recommended to execute the topics 1006A and 1006B, respectively. The scheduling GUI 1000 may also include a schedule affordance 1010 and a dismiss affordance 1012. The client organization may choose the schedule affordance 1010 if the recommended execution schedule 1002 is satisfactory in meeting the client organization's goal, or may choose the dismiss affordance 1012 if the recommended execution schedule 1002 is unsatisfactory in meeting the client organization's goals. Upon selection of the dismiss affordance 1012, the topic model ML engine 104 may generate one or more alternative recommended execution schedules.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A method, comprising:
receiving, via a processor, a plurality of queries from a client device;
receiving, via the processor, execution statistics for each of the plurality of queries;
determining, via the processor, one or more topics based on one or more characteristics of the plurality of queries;
grouping, via the processor, the plurality of queries into the one or more topics;
calculating, via the processor, execution statistics for each topic of the one or more topics, based upon the execution statistics of queries of a corresponding topic;
applying, via the processor, the plurality of queries and the execution statistics associated with each of the plurality of queries to a machine learning model to identify potentially relevant characteristics of the plurality of queries that result in a threshold level of divergent execution between two or more of the plurality of queries;
providing, to a downstream system, an indication of the execution statistics and the potentially relevant characteristics for each topic of the one or more topics;
performing, based on the execution statistics, an efficiency simulation;
identifying, based on the efficiency simulation, an optimized scheduling for the plurality of queries; and
providing an electronic indication of the identified optimized scheduling of the plurality of queries, wherein the electronic indication comprises an electronic instruction to render a graphical user interface (GUI), the GUI comprising a scheduling recommendation, a recommended time of query execution, one or more recommended topics, and one or more recommended cloud computing resources available for purchase from a cloud service provider by which to execute the queries.

2. The method of claim 1, wherein the one or more characteristics of the plurality of queries comprises objects of the plurality of queries.

3. The method of claim 2, wherein the objects of the plurality of queries comprise tables, indices, catalogs, schemas, journals, or any combination thereof.

4. The method of claim 1, wherein the one or more characteristics of the plurality of queries comprises constraints of the plurality of queries.

5. The method of claim 4, wherein the constraints of the plurality of queries comprise a column of data or a particular value within the column of data.

6. The method of claim 1, wherein the execution statistics for each topic of the one or more topics comprises at least an average length of execution of each query in a topic and an average amount of memory used in executing each query in the topic, at a particular time of execution.

7. The method of claim 1, comprising:
identifying execution statistics for each query in a set of queries of a particular topic;
identifying statistical divergence between two or more of the set of queries;
determining that the statistical divergence breaches a pre-defined threshold;

in response to the statistical divergence breaching the pre-defined threshold, identifying one of the two or more of the set of queries as a query drafted in a potentially more-efficient manner than other queries of the set of queries; and in response to identifying the query drafted in a potentially more-efficient manner, providing a notification of the identified query drafted in a potentially more-efficient manner.

8. The method of claim 1, comprising generating, in response to identifying the potentially relevant characteristics, the one or more topics based upon the potentially relevant characteristics.

9. The method of claim 1, comprising identifying a statistical divergence amount associated with two or more queries of a common topic with different relevant characteristics.

10. The method of claim 9, comprising:
determining that the statistical divergence amount is greater than a divergence threshold; and
in response, providing an efficiency graphical user interface (GUI) indicating that a more efficient query structure may be possible.

11. The method of claim 10, wherein the efficiency GUI includes the statistical divergence amount associated with the two or more queries of the common topic, the identified relevant characteristics of the plurality of queries that result in the divergent execution, and a recommendation for how to resolve the divergent execution.

12. The method of claim 1, wherein the potentially relevant characteristics comprise the use of wildcards, internal optimizations, or both.

13. A tangible, non-transitory, computer-readable medium, comprising computer-readable instructions that, when executed by one or more processors of an electronic device, cause the electronic device to:
receive, via a processor, an indication of previously purchased cloud computing resources of a cloud service configured to execute queries;
receive, via the processor, an indication of cloud computing resources of the cloud service available to be purchased, the cloud computing resources available to be purchased configured to execute the queries;
receive, via the processor, query execution statistics for a plurality of topics, the plurality of topics each comprising a group of one or more of a plurality of processing queries executed via the cloud service;
receive, via the processor, constraints associated with execution of the queries;
perform, based on the previously purchased cloud computing resources, the cloud computing resources available to be purchased, the query execution statistics of the processed queries, and the constraints associated with the execution of the queries, an efficiency simulation;
identify, based on the efficiency simulation, an optimized scheduling of the query execution; and
provide an electronic indication of the identified optimized scheduling of the query execution.

14. The tangible, non-transitory, computer-readable medium of claim 13, comprising computer-readable instructions that, when executed by the one or more processors of the electronic device, cause the electronic device to:
receive purchase costs and overage rules of the cloud computing resources available to be purchased and identify the optimized scheduling of the query execution based at least on the received purchase costs and overage rules and the efficiency simulation.

15. The tangible, non-transitory, computer-readable medium of claim 13, comprising computer-readable instructions that, when executed by the one or more processors of the electronic device, cause the electronic device to receive purchase costs and overage rules of the previously purchased cloud computing resources.

16. The tangible, non-transitory, computer-readable medium of claim 13, wherein the electronic indication comprises an electronic instruction to render a graphical user interface (GUI), the GUI comprising a scheduling recommendation, a recommended time of query execution, one or more recommended topics, and one or more recommended cloud computing resources by which to execute the queries.

17. A system, comprising:
a client device, configured to request for execution of a plurality of processing queries by a cloud service provider host device;
a topic model machine learning engine comprising processing circuitry, configured to:
receive the plurality of processing queries and execution statistics for each of the plurality of processing queries; and
determine an optimized scheduling of the one or more queries by:
performing machine learning on the plurality of processing queries to identify potentially relevant characteristics of the plurality of processing queries;
generating topics based upon the potentially relevant characteristics;
categorizing the plurality of processing queries into topics;
calculating execution statistics for the topics; and
performing a scheduling simulation based upon the execution statistics for the topics to identify an optimized scheduling of the plurality of processing queries, wherein performing the scheduling optimization comprises generating an electronic instruction to render a graphical user interface (GUI), the GUI comprising a scheduling recommendation, a recommended time of query execution, one or more recommended topics, and one or more recommended cloud computing resources available to purchase from the cloud service provider by which to execute the processing queries.

18. The system of claim 17, comprising a database configured to:
receive, from the cloud service provider, the execution statistics; and
store the execution statistics associated with executed queries.

19. The system of claim 17, wherein the topic model machine learning engine is configured to:
generate the topics based upon one or more objects of the plurality of processing queries, one or more constraints of the plurality of processing queries, or both.

20. The tangible, non-transitory, computer-readable medium of claim 13, wherein the efficiency simulation is configured to identify optimized scheduling of queries based on the execution statistics, constraints, and a specified goal.

* * * * *